United States Patent Office 3,480,576
Patented Nov. 25, 1969

3,480,576
ALKYD RESIN-DEPOLYMERIZED POLYMER BLENDS
Brian Edward Bailey, Brockenhurst, and Vivian Charles Owen Dando, Hythe, England, assignors to The International Synthetic Rubber Company Limited, Southampton, England, a corporation of the United Kingdom
No Drawing. Filed Apr. 5, 1967, Ser. No. 628,564
Claims priority, application Great Britain, Apr. 14, 1966, 16,420/66
Int. Cl. C08g 39/10
U.S. Cl. 260—22
8 Claims

ABSTRACT OF THE DISCLOSURE

An alkyd resin blend includes a low molecular weight depolymerized (co)polymer of butadiene and a compatible alkyd resin. The alkyd resin is one prepared from an unsaturated oil or the fatty acids thereof having a linolenic acid component of less than 10%.

---

The present invention relates to a process for producing films of alkyd resins containing low molecular weight polymers or copolymers of butadiene.

The invention is concerned with improving the physical properties of surface coating films, prepared from certain alkyd resins as herein after defined. It is well known that alkyd resins have poor solvent resistance; this is often tested by their resistance to acetone.

Improvements in the hardness, flexibility and solvent resistance of alkyd resins are achieved by the present invention. Films of the blends, prepared according to this invention, air-dry but there is no real improvement in drying time.

In British patent specification No. 995,928 the grafting of polybutadiene polymers onto glyceride oils and fatty acids thereof prior to forming the alkyd resin is described. This process is, however, time consuming and the quantity of butadiene polymer that can be introduced is limited by the viscosity of the polymer oil blends, either during the grafting stage or during the subsequent alkyd preparation.

According to the present invention an alkyd resin blend comprises a low molecular weight, depolymerized polymer or copolymer of butadiene and a compatible alkyd resin prepared from an unsaturated oil or a fatty acid thereof in which the linolenic acid component is less than 5%.

Alkyd resin formulations according to the present invention produce clear compatible films which have greatly improved physical properties over those not containing depolymerized polybutadiene and which are of particular use in surface coatings. The (co)polymer is incorporated in the alkyd resin by blending.

By "depolymerized polybutadiene" we mean polybutadiene prepared in accordance with the process described in British specification No. 1,057,014 or polybutadiene the same as that prepared in accordance with said process. The polymers that are treated by this process are preferably obtained by solution polymerization in a hydrocarbon solvent and are stereospecific, having a vinyl content of less than 10%. Other polymers may also be used but do not give such good results, when employed in the present invention, as polymers with a low 1,2 content. The latter give good, clear films with no haziness, a high hardness and good resistance to solvents.

Depolymerization is carried out in non-aqueous solvents using free radical initiators and oxygen from various sources, i.e. chemicals, the atmosphere. Transition metal salts which are soluble in organic solvents can be used to promote the depolymerization, e.g. cobalt 2-ethyl hexanoate. The depolymerization may be carried out at temperatures in the range from 80° to 180° C., the best results being obtained when the temperature is in the range from 110° to 130° C.

During depolymerization the viscosity of the polymer drops steadily giving a final molecular weight within the required range. Both aliphatic and aromatic hydrocarbons are used as solvents although aliphatic solvents such as white spirit have been found to be less effective than xylene and toluene.

The molecular weight of the depolymerized polymers and copolymers of butadiene is in the range from 2,000 to 20,000. Butadiene polymers depolymerized to about this level have a viscosity of a workable level (a 50% solution has a viscosity of about 250–350 cps. at 25° C.). Polymers having a molecular weight above about 10,000 are solid but may still be used in the process of the present invention and are applied in hydrocarbon solution.

An essential feature of the depolymerized butadiene polymers or copolymers which are incorporated in the alkyd resins is that they contain oxygen in their structure, as —OH and/or —COOH groups.

Low molecular weight oxygenated polymers of this type may also be prepared by introducing oxygenated groups into a liquid polymer or copolymer of butadiene by bubbling through it a gas containing free oxygen, at an elevated temperature. Whilst these "oxygenated" polymers may also be advantageously incorporated in alkyd resins, the results obtained are not as satisfactory as with the depolymerized butadiene polymers and copolymers obtained in accordance with the aforementioned British specification No. 1,057,014.

The depolymerized polymers may be homopolymers or copolymers of butadiene. Suitable co-monomers include styrene, acrylonitrile, isoprene, divinyl benzene and vinyl toluene. However, better results are obtained, in general, by the use of a homopolymer of butadiene.

As is well known, conventional alkyd resins are prepared from the condensation product of a dibasic acid anhydride, a polyhydroxy alcohol, such as glycerol or pentaerythritol and an unsaturated oil or fatty acid. We have found that resins prepared from certain unsaturated fatty acids or oils form blends which are compatible with low molecular weight polybutadiene, in which oxygen containing groups have been incorporated, to give films having enhanced properties. The following Table 1 lists the fatty acids which we have found to be compatible and gives the percentages of the main constituents.

TABLE 1

| Acids | Acid Content, Percent | | |
|---|---|---|---|
| | Oleic, $C_{18}H_{34}O_2$ | Linoleic, $C_{18}H_{32}O_2$ | Linolenic, $C_{18}H_{30}O_2$ |
| Dehydrated castor oil fatty acid | 8.6 | 82.5 | |
| Safflower oil fatty acid | 13.0 | 77 | |
| Walnut oil fatty acid | 1.78 | 73.3 | 3.3 |
| Tall oil fatty acid | 32 | 65 | |
| Sunflower oil fatty acid | 34 | 58.5 | |
| Soya bean oil fatty acid | 33.5 | 52.5 | 2.3 |
| Cottonseed oil fatty acid | 33 | 43.5 | |

The glyceride oils from which these fatty acids are derived are equally useful.

It is readily seen that each of these fatty acids contain only a low quantity or no linolenic acid. The amount of linolenic acid is critical, the maximum amount permissible being 5%.

Films produced from blends of linseed oil fatty acid alkyds (the acids of which contain 45% of linolenic acid) with the depolymerized or oxygenated butadiene polymers show no improvements over the alkyd alone, in fact their properties are inferior.

From these facts it follows that any oil or fatty acid in which the major acid components are in the following proportions (Table 2) may be used in the present invention:

TABLE 2

| Acid: | Content, percent |
|---|---|
| Oleic | 5–40 |
| Linoleic | 40–85 |
| Linolenic | less than 5 |

The alkyds, with which the present invention is concerned, have very long oil length, long oil length, medium oil length and short oil length. The expression "oil length" denotes the proportion of drying oil present in a composition.

| | Percent oil |
|---|---|
| Very long oil length | 71 |
| Long oil length | 56–70 |
| Medium oil length | 46–55 |
| Short oil length | 35–45 |

The compositions of these alkyds are shown in the following tables; Table 3a showing the composition when pentaerythritol is used as the polyhydroxy alcohol and Table 3b where glycerol is used.

TABLE 3a

| Constituents | Oil Length | | |
|---|---|---|---|
| | Long | Medium | Short |
| Fatty Acid, moles | 1.5 | 1 | 0.5 |
| Pentaerythritol, moles | 1 | 1 | 1 |
| Phthalic anhydride, moles | 1 | 1 | 1 |

TABLE 3b

| Constituents | Oil Length | | |
|---|---|---|---|
| | Long | Medium | Short |
| Fatty Acid, moles | [1] 9 | 5 | 2 |
| Glycerol, moles | 6 | 6 | 6 |
| Phthalic anhydride, moles | 6 | 6 | 6 |

[1] 6 moles of fatty acid + 3 moles of the corresponding oil could also be used.

In all the above cases the three constituents were mixed together and 50 g. xylene added. They were heated to 200–240° C. on a Dean & Stark condenser system to remove the water from the condensation reaction.

The batch was held at this temperature, with nitrogen bubbling through, until the end acid value was between 5 and 15 mg. KOH/g. resin. The final alkyd was diluted to 60–70% solids content, with xylene or white spirit. (Dilution to 60–70% solids reduces the viscosity of the alkyd to a manageable level.)

If the alkyd is to be prepared from the oil rather than the fatty acid either an acidolysis stage or an alcoholysis stage must first be carried out. Acidolysis involves heating the oil (triglyceride) with the dibasic acid (e.g. phthalic acid) to release some of the free acid i.e. some of the oil is converted to the acid.

The polyol is added and the above process carried out to form the alkyd.

If an alcoholysis stage is carried out, the oil-(triglyceride) is heated with the polyol to convert it to the monoglyceride. The monoglyceride is then reacted with the phthalic anhydride as above to form the alkyd.

The addition of only a small amount e.g. from 1 to 10% of depolymerized polymer to a compatible alkyd resin results in an immediately sometimes quite rapid, improvement in the properties of the alkyd resin. As the proportion of polymer blended with the alkyd resin is increased so, in general, the hardness and solvent resistance of the blend increases. Although this improvement is not always maintained as more polymer is added and there may be some "fall off" from the maximum, the properties of the blend are still superior to those of the unmodified resin. The properties of a resin blend containing a specific amount of polymer will naturally vary from alkyd resin to alkyd resin. Thus with different alkyd resins, optimum properties of the blend will be obtained with different amounts of polymer. In nearly all cases, however, optimum properties are obtained with compositions containing 40–60% polymer.

Alkyd resin blends according to the present invention can be filled and pigmented to give useful protective and decorative coatings. Air-drying paints suitable for use as wood primers, undercoats and finishing coats as well as stoved primers and finishing coats for metal protection can be prepared using such blends.

Driers have to be added to the system to cure them. Those used are the 2-ethylhexanoates of lead, calcium and cobalt in various proportions. Air drying is carried out at 20° C. on a B.K. drying time recorder (see British Patent No. 633,586) and stoving at 150° C. for 30 minutes.

Note on the B.K. drying time recorder

When the needle of the recorder moves down the drying film four definite stages develop.

(a) a pear shaped impression corresponding to the time taken for the evaporation of solvent
(b) a continuous track—"sol-gel" transition
(c) an interrupted track—surface dry
(d) final drying time—no marks at all The three figures in the examples represent the three drying periods.

The following examples serve to illustrate the invention. The depolymerized polybutadiene used had a molecular weight of about 7,000 to 10,000 with a distribution in the range 2,000 to 20,000.

EXAMPLE 1

Soya bean oil alkyd/depolymerized polybutadiene blends

Blends of the alkyd and depolymerized polybutadiene were made by adding depolymerized polybutadiene as 100% solids, or as a solution in xylene, or as a solution in white spirit, to the alkyd in solution in xylene or white spirit. Driers were added e.g. 0.25% cobalt 2-ethylhexanoates.

Films of these blends were laid at one thousandths (.001″) thickness on glass plates (using a "Rel" thin film applicator) and stoved thirty minutes at 150° C.

The resulting films were tested for solvent resistance, by rubbing them with acetone, and scratch hardness (using the apparatus set down in the standard methods of testing, DEF–1053 method 14). In this and in the following examples, the "ratio" of alkyd to depolymerized polymer is by weight.

| Ratio Alkyd: Depolymerized Polybutadiene | Resistance to acetone | Scratch hardness in gram |
|---|---|---|
| 100/0 | Removed | 500 |
| 90/10 | do | 600 |
| 60/40 | do | |
| 50/50 | Softened | |
| 40/60 | Slight tackiness developed | 700 |
| 10/90 | Resistant | |
| | do | 800 |

EXAMPLE 2

Tall oil fatty acid alkyd/depolymerized polybutadiene blends

Blends are formed as in Example 1, replacing the soyabean oil alkyd with a tall oil fatty acid alkyd.

| Ratio Alkyd: Depolymerized Polybutadiene | Resistance to acetone | Scratch hardness in grams |
|---|---|---|
| 100/0 | Softened. Removed | 600 |
| 90/10 | Very soft | 600 |
| 50/50 | Slight tackiness developed | 1,000 |
| 10/90 | Resistant | 800 |
| 0/100 | | |

Blends formed as above were laid in thin film on the B.K. drying time recorder.

| | B.K. Drying Time Recorder |
|---|---|
| Ratio Alkyd: Depolymerized Polybutadiene: | |
| 100/0 | ¼-1-17 (hours). |
| 90/10 | <⅕-4¾-12 (hours). |
| 50/50 | ½-14-6 (hours). |
| 10/90 | 1-16½-2½ (hours). |

EXAMPLE 3

Dehydrated castor oil fatty acid—glycerol alkyd/depolymerized polybutadiene blends Blends were made up as in Example 1, replacing the soya bean oil alkyd with a dehydrated castor oil fatty acid glycerol alkyd.

| Ratio Alkyd: Depolymerized Polybutadiene | Resistance to acetone | Scratch hardness in grams |
|---|---|---|
| 100/0 | Removed | 600 |
| 90/10 | Very much softened | 800 |
| 50/50 | Resistant | 800 |
| 10/90 | do | 800 |

Blends were formed and tested by laying in a thin film on a B.K. drying time recorder.

| Ratio Alkyd: Depolymerized Polybutadiene | B.K. drying time recorder |
|---|---|
| 100/0 | ¼-5½-14 (hours). |
| 90/10 | ½-4-15½ (hours). |
| 70/30 | ½-17-1 (hours). |
| 50/50 | |
| 30/70 | Did not dry thoroughly in 48 hours. |
| 10/90 | |

EXAMPLE 4

Sunflower fatty acid alkyd/depolymerized polybutadiene

Blends were formed as in Example 1, replacing the soya bean oil alkyd with sunflower fatty acid alkyd.

| Ratio Alkyd: Depolymerized Polybutadiene | Resistance to Acetone | Scratch hardness in grams |
|---|---|---|
| 100/0 | | 600 |
| 90/10 | Very much softened. Removed | 600 |
| 75/25 | | 600 |
| 60/40 | | 700 |
| 50/50 | | 1,000 |
| 40/60 | | 800 |
| 25/75 | Resistant | 600 |
| 10/90 | | 600 |
| 0/100 | | |

EXAMPLE 5

Soya bean oil fatty acid—pentaerythritol alkyd/depolymerized polybutadiene blends Blends were formed as in Example 1, replacing the soya bean oil alkyd by the soya bean oil fatty acid—pentaerythritol alkyd.

| | B.K. Drying time recorder |
|---|---|
| Ratio Alkyd: Depolymerized Polybutadiene: | |
| 100/0 | <¼-2½-3½ (hours). |
| 90/10 | ¼-3-5½ (hours). |
| 70/30 | ¼-6¾-2½ (hours). |
| 50/50 | ¼-7-2 (hours). |
| 30/70 | 2½-20½-11½ (hours). |
| 10/90 | 4-12-27 (hours). |

EXAMPLE 6

Tall oil fatty acid alkyd/depolymerized styrene-butadiene copolymer blends

Blends were formed as in the previous examples only replacing the alkyd with a tall oil fatty acid alkyd and the depolymerized polybutadiene with a depolymerized styrene-butadiene copolymer.

| Ratio Alkyd: Styrene-Butadiene Copolymer | Resistance to acetone | Scratch hardness in grams |
|---|---|---|
| 100/0 | Softened. Removed | 600 |
| 90/10 | Softened. Not removed | 700 |
| 50/50 | do | 700 |
| 10/90 | Resistant | 700 |
| 0/100 | do | |

EXAMPLE 7

Soya bean oil alkyd/hydroxyl terminated acrylonitrile-butadiene copolymer

Blends were formed as in the previous examples, replacing the alkyd with soya bean oil alkyd and the depolymerized polybutadiene with hydroxyl terminated acrylonitrile-butadiene copolymer (MW 2500–3000).

The results show that while these blends will form films they are not as good as those from blends with the depolymerized polybutadiene.

| | Resistance to acetone | Scratch hardness in grams |
|---|---|---|
| Ratio Alkyd: Copolymer: | | |
| 100/0 | Removed early. | 500 |
| 90/10 | Softened and removed. | 500 |
| 50/50 | Greatly softened. | 600 |
| 10/90 | Some resistance. | 600 |
| 0/100 | Resistant | |

EXAMPLE 8

Soya bean oil alkyd/hydroxyl terminated polybutadiene

Blends were formed as in the previous examples only replacing the copolymer with hydroxyl terminated polybutadiene. (MW 3000–3500).

The results show that while films can be formed their properties are not as good as those formed from depolymerized polybutadiene.

| | Resistance to acetone | Scratch hardness in grams |
|---|---|---|
| Ratio Alkyd: Polymer: | | |
| 100/0 | Removed | 500 |
| 90/10 | Softened and removed. | 300 |
| 50/50 | Softened | 500 |
| 10/90 | Some resistance. | 600 |
| 0/100 | Resistant | |

Some typical paint formulations

The figures quoted are parts by weight.

|  |  | Pink Primer | Grey Primer | Under- coat | Finishing coat |
|---|---|---|---|---|---|
| Binder | 50% solution of depolymerized polybutadiene in white spirit | 140 | 140 | 140 | 140 |
|  | 75% solution of tall oil alkyd in white spirit | 40 | 40 | 40 | 40 |
| Pigments and fillers | Rutile | 112.5 | 112.5 | 123 | 100 |
|  | Barytes | 61.4 | 61.4 | 40.4 |  |
|  | Red Lead | 2.04 |  |  |  |
|  | Fine S.F. |  | 10 |  |  |
|  | +Winnofill S | 47.8 | 47.8 | 61.8 |  |
| Driers | Cobalt Siccatol [1] | 0.09 | 0.09 | 0.09 | 0.09 |
|  | Calcium Siccatol [1] | 0.27 | 0.27 | 0.27 | 0.27 |
|  | Lead Siccatol [1] | 0.9 | 0.9 | 0.9 | 0.9 |
|  | White Spirit |  | (As required [2]) |  |  |

+Winnofill S in a trademark of I.C.I.
[1] Siccatol is a trademark of Novadel Ltd. (2-ethyl hexanoate).
[2] Various fiuantities of white spitir were added to make paints of suitable consistency for application both by spraying and by brush.

The pigments and fillers were mixed with sufficient alkyd resin solution to wet them and white spirit was added to give the mix a consistency suitable for ball milling. After ball milling overnight the remainder of the alkyd resin solution, the depolymerized polybutadiene solution and the driers were added followed by white spirit sufficient to give the required final viscosity.

B.K. drying characteristics:

Pink:                                             Hours
   1.5 thou. thick _____ ¼–1¼–1
   3 thou. thick _____ ½–1½–1½
Grey _____ ¼–4¼– ¾
Undercoat _____ ¼–1–1¼
Finishing coat _____ ¼–4¾–4¼

The paints were of good consistency and gave films with excellent physical properties.

| Stove Coatings | Primer | Primer Surfacer |
|---|---|---|
| 50% solution of depolymerized polybutadiene | 150 | 150 |
| Enalkyd T 628/75/80P [1] | 100 | 100 |
| Micromized natural redoxide [2] | 10 | 109 |
| China clay |  | 159 |
| Micromized whiting [2] |  | 69.5 |
| Rutile | 168.8 |  |
| Barytes | 92.5 |  |
| Winnofill S | 72.0 |  |
| White Spirit | (As required) |  |

[1] Enalkyd T 628/75/80P is a long oil length tall oil alkyd, marketed by Leon Fenkl Limited.
[2] Micromized materials are marketed by Golden Valley Products Limited.

After curing for 35 minutes at 200° C. films laid had excellent physical properties and good resistance to water.

What is claimed is:

1. An alkyl resin blend comprising a low molecular weight depolymerized polymer, selected from the group consisting of homopolymers and copolymers of butadiene which include oxygen in their structure as —OH and/or —COOH, and a compatible alkyd resin prepared from a material selected from the group consisting of unsaturated fatty acids and the glyceride oils from which such fatty acids are derived, in which the linolenic acid component is less than 5% by weight.

2. An alkyd resin blend according to claim 1 wherein the molecular weight of the depolymerized polymer lies in the range from 2,000 to 20,000.

3. An alkyd resin blend according to claim 1 wherein the depolymerizing polymer is one obtained by depolymerizing a stereospecific polymer, having a vinyl content of less than 10%, and selected from the group consisting of stereospecific homopolymers of butadiene and copolymers of butadiene in which the butadiene portion is stereospecific.

4. An alkyd resin blend according to claim 1 wherein the comonomer in the depolymerized copolymer is selected from the group consisting of styrene, acrylonitrile, isoprene, divinyl benzene and divinyl toluene.

5. An alkyd resin blend according to claim 1 containing from 40 to 60% depolymerized polymer, said polymer having an average molecular weight in the range of 7,000–10,000.

6. An alkyd resin blend comprising a low molecular weight depolymerized polymer, selected from the group consisting of homopolymers and copolymers of butadiene which include oxygen in their structure as —OH and/or —COOH, and a compatible alkyd resin prepared from a material selected from the group consisting of unsaturated fatty acids and the glyceride oils from which such fatty acids are derived, which has an oleic acid component from 5 to 40%, a linoleic acid component of from 40 to 85% and a linolenic acid component of less than 5% by weight.

7. An alkyd resin blend according to claim 6 wherein the compatible alkyd resin is prepared from a material selected from the group consisting of dehydrated castor oil, safflower oil, walnut oil, tall oil, sunflower oil, soya bean oil, cottonseed oil and the fatty acids of said oils.

8. An alkyd resin blend comprising a depolymerized polymer, having a molecular weight in the range of from 2,000 to 20,000 selected from the group consisting of homopolymers and copolymers of butadiene and prepared by reacting a (co)polymer of butadiene in non-aqueous solvent with a free radical initiator in the presence of oxygen at a temperature in the range from 80° to 180° C., and a compatible alkyd resin prepared from a material, selected from the group consisting of unsaturated fatty acids and the glyceride oils from which such fatty acids are derived, having a linolenic acid content of less than 5% by weight, said depolymerized polymer including oxygen in its structure as —OH and/or —COOH.

References Cited

UNITED STATES PATENTS

| 2,662,862 | 12/1953 | Crouch | 260—22 |
| 2,888,417 | 5/1959 | Crouch | 260—22 |
| 3,196,121 | 7/1965 | McKay et al. | 260—23.7 |
| 3,313,793 | 4/1967 | De La Mare et al. | 260—23.7 |

FOREIGN PATENTS

| 995,928 | 6/1965 | Great Britain. |
| 1,077,354 | 11/1953 | Germany. |

DONALD E. CZAJA, Primary Examiner

R. W. GRIFFIN, Assistant Examiner

U.S. Cl. X.R.

117—124, 161, 167; 260—23.7, 33.6, 40, 41.5